(12) United States Patent
Oohashi (10) Patent No.: US 7,456,532 B2
(45) Date of Patent: Nov. 25, 2008

(54) DYNAMOELECTRIC MACHINE

(75) Inventor: Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 477 days.

(21) Appl. No.: 11/241,976

(22) Filed: Oct. 4, 2005

(65) Prior Publication Data

US 2006/0273671 A1 Dec. 7, 2006

(30) Foreign Application Priority Data

Jun. 2, 2005 (JP) .............................. 2005-162883

(51) Int. Cl.
*H02K 11/00* (2006.01)
(52) U.S. Cl. .......................... 310/68 D; 310/89; 310/71
(58) Field of Classification Search .................. 310/71, 310/68 D, 64, 89
See application file for complete search history.

(56) References Cited

U.S. PATENT DOCUMENTS

| | | | | | |
|---|---|---|---|---|---|
| 4,546,280 | A | * | 10/1985 | Pfluger | .................... 310/68 D |
| 4,705,983 | A | * | 11/1987 | Franz et al. | ................ 310/68 D |
| 5,453,648 | A | * | 9/1995 | Bradfield | ..................... 310/71 |
| 6,150,741 | A | * | 11/2000 | Hayashi et al. | ........... 310/68 D |
| 6,528,912 | B2 | * | 3/2003 | Asao | ........................ 310/68 D |
| 6,664,682 | B2 | * | 12/2003 | Williams et al. | ............... 310/89 |
| 6,936,941 | B2 | * | 8/2005 | Oohashi et al. | ........... 310/68 D |

FOREIGN PATENT DOCUMENTS

JP 9-107654 4/1997

* cited by examiner

*Primary Examiner*—Dang D Le
(74) *Attorney, Agent, or Firm*—Sughrue Mion, PLLC (57) ABSTRACT

A sleeve is mounted to an output terminal so as to be fitted over an output extraction end and is fastened between a cylindrical portion and a relay member mounting nut screwed onto an external thread portion such that the sleeve is in a close state of surface contact with the cylindrical portion and the relay member mounting nut. A wiring harness terminal is fastened between the relay member mounting nut and a wiring harness terminal mounting nut screwed onto the external thread portion such that the wiring harness terminal is in a close state of surface contact with the two nuts. In addition, a molded portion is molded so as to cover an outer peripheral surface of the sleeve, and is mounted such that a portion of the molded portion projecting outward from the sleeve is fitted over an output extraction end of the cylindrical portion.

9 Claims, 6 Drawing Sheets

DYNAMOELECTRIC MACHINE

BACKGROUND OF THE INVENTION

1. Field of the Invention

The present invention relates to a dynamoelectric machine such as an automotive alternator, etc., and particularly to an output terminal construction used to direct output power from the dynamoelectric machine to external equipment.

2. Description of the Related Art

In conventional automotive alternators, an external screw thread portion is disposed at an opposite end of an output terminal bolt from an output extraction end, the external screw thread portion of the output terminal bolt being fastened to a one-sided tightening nut secured by crimping to a penetrating aperture disposed on a positive-side cooling fin of a rectifier apparatus. At the output extraction end of the output terminal bolt, a wiring harness terminal is fastened with a nut by means of a first electrically-insulating bush made of a resin, a rear-end end frame, and a second electrically-insulating bush made of a resin. (See Patent Literature 1, for example.)

Patent Literature 1: Japanese Patent Laid-Open No. HEI 09-107654 (Gazette)

In conventional automotive alternators, a terminal that is electrically connected to the automotive vehicle wiring harness is inserted into the output terminal bolt and fastened with the nut to output electric power to automotive vehicle equipment. Now, in an electrical conduction pathway leading from the positive-side cooling fin to the output terminal bolt, a coupling portion between the external screw thread portion at the opposite end of the output terminal bolt from the output extraction end and the one-sided tightening nut interposes, and in an electrical conduction pathway leading from the output terminal bolt to the wiring harness terminal, a coupling portion between the external screw thread portion at the output extraction end of the output terminal bolt and the nut interposes. Electrical resistance at these coupling portions is large, increasing heat generated at the coupling portions during extraction of high-output electric current.

Thus, heat generated at the coupling portion at the opposite end of the output terminal bolt from the output extraction end gives rise to temperature increases in diodes constituting the rectifier apparatus that are disposed in close proximity to the output terminal bolt. Heat generated at the coupling portions at the output extraction end of the output terminal bolt also gives rise to heat degradation and thermal contraction of the electrically-insulating bushes made of a resin, loosening the coupling by the nut, thereby giving rise to reductions in force fastening the wiring harness terminal to the output terminal bolt.

Because the two electrically-insulating bushes are disposed so as to leave gaps in an axial direction of the output terminal bolts, the output terminal bolts, which have a higher electric potential than the rear-end end frame, are exposed at this portion. Thus, corrosion may arise in exposed portions of the output terminal bolts if the automotive alternator is used in an environment such as salt water, etc., giving rise to deterioration in electrical insulation.

SUMMARY OF THE INVENTION

The present invention aims to solve the above problems and an object of the present invention is to provide a dynamoelectric machine preventing the occurrence of insufficient force for fastening a wiring harness terminal to an output terminal by eliminating coupling portions involving screw threads in a main electrical conduction pathway from a rectifier apparatus to the wiring harness terminal to suppress heat generation at the output terminal, and enabling deterioration of electrical insulation to be prevented by suppressing exposure of an output terminal and a positive-side heat sink to suppress the occurrence of corrosion of the output terminal and the positive-side heat sink.

In order to achieve the above object, according to one aspect of the present invention, there is provided a dynamoelectric machine including: a rectifier apparatus having positive-side and negative-side heat sinks each mounted with a plurality of diode elements; and a circuit board made of a resin in which insert conductors for connecting the diode elements are insert molded, the rectifier apparatus being mounted to a housing by electrically-connecting the negative-side heat sink to the housing and fastening the positive-side and negative-side heat sinks and the circuit board to a mounting surface of the housing; an output terminal for externally extracting output from the rectifier apparatus; and a wiring harness terminal mounted to the output terminal. An output terminal mount portion is formed so as to project in an axial direction of the dynamoelectric machine from a first end of the positive-side heat sink. The output terminal has an external screw thread portion disposed on an output extraction end thereof, the output terminal being disposed by mounting an opposite end from the extraction end to the output terminal mount portion such that the external screw thread portion projects outward in the axial direction through an extraction aperture formed in the housing. A tubular relay member is mounted to the output terminal so as to be fitted over the output extraction end of the output terminal and is fastened between the output terminal mount portion and a relay member mounting nut screwed onto the external thread portion of the output terminal such that the relay member is in a state of surface contact with the output terminal mount portion and the relay member mounting nut. The wiring harness terminal is fastened between the relay member mounting nut and a wiring harness terminal mounting nut screwed onto the external thread portion of the output terminal such that the wiring harness terminal is in a state of surface contact with the relay member mounting nut and the wiring harness terminal mounting nut. A tubular electrically-insulating member is disposed so as to cover an output extraction end of the output terminal mount portion and the relay member.

According to the present invention, the relay member is placed in a close state of surface contact with the output terminal mount portion and the relay member mounting nut, and the wiring harness terminal is also placed in a close state of surface contact with the relay member mounting nut. Thus, linking portions that increase electrical resistance such as coupling portions involving screw threads, etc., are removed from a main electrical conduction pathway extending from the positive-side heat sink to the wiring harness terminal, suppressing the generation of heat at the output terminal. Because the electrically-insulating member is fitted over the output extraction end of the output terminal mount portion and the relay member, in which electric potential is higher than in the housing and which are in close proximity to the housing, exposure of the output extraction end of the output terminal mount portion and the relay member is suppressed. Thus, the occurrence of corrosion of the output extraction end of the output terminal mount portion and the relay member is suppressed, ensuring electrical insulation even if the present invention is used in an environment such as salt water, etc.

DETAILED DESCRIPTION OF THE PREFERRED EMBODIMENTS

Preferred embodiments of the present invention will now be explained with reference to the drawings.

Embodiment 1

Figure 1:
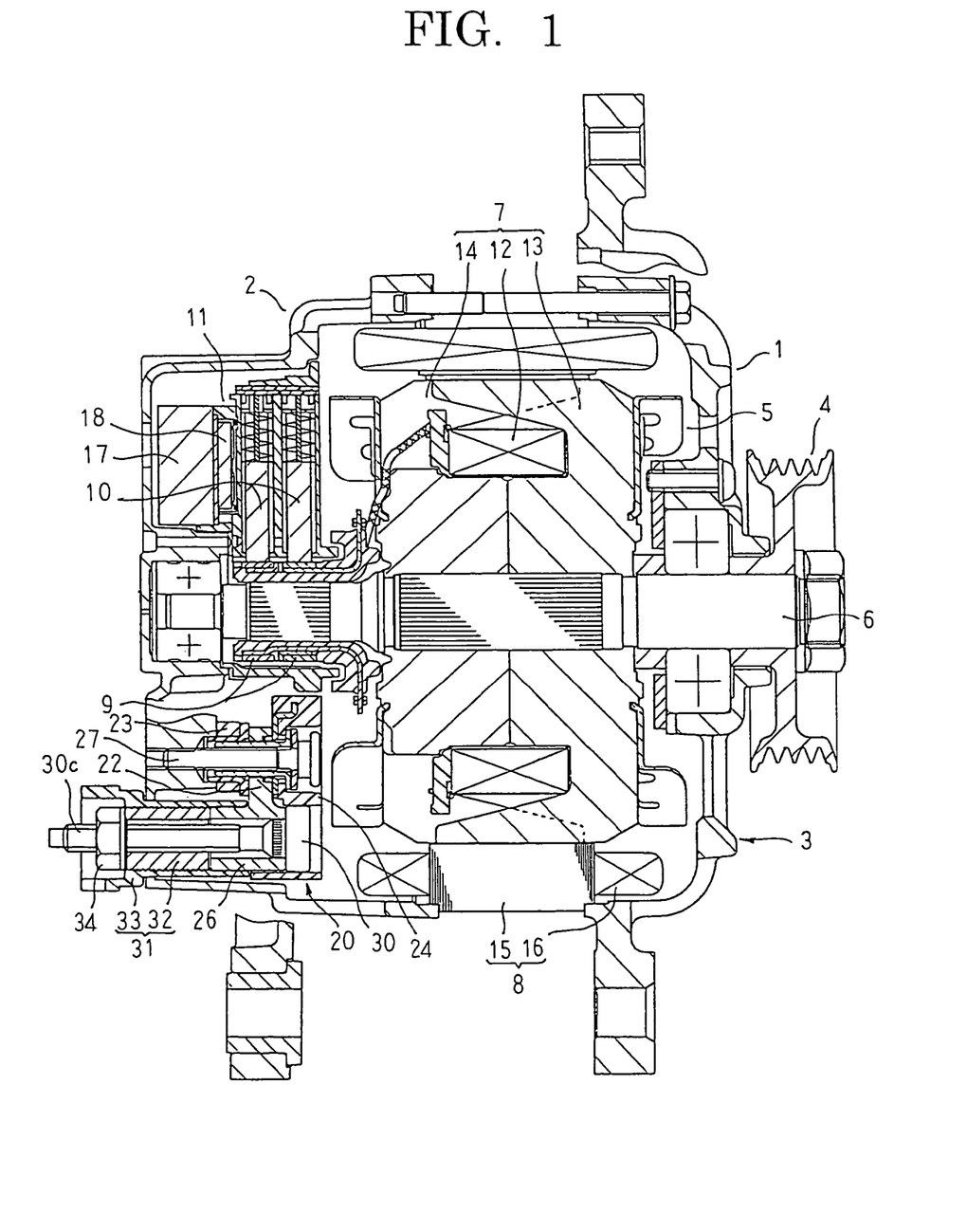
FIG. 1 is a longitudinal section showing an automotive alternator according to Embodiment 1 of the present invention.
Figure 2:
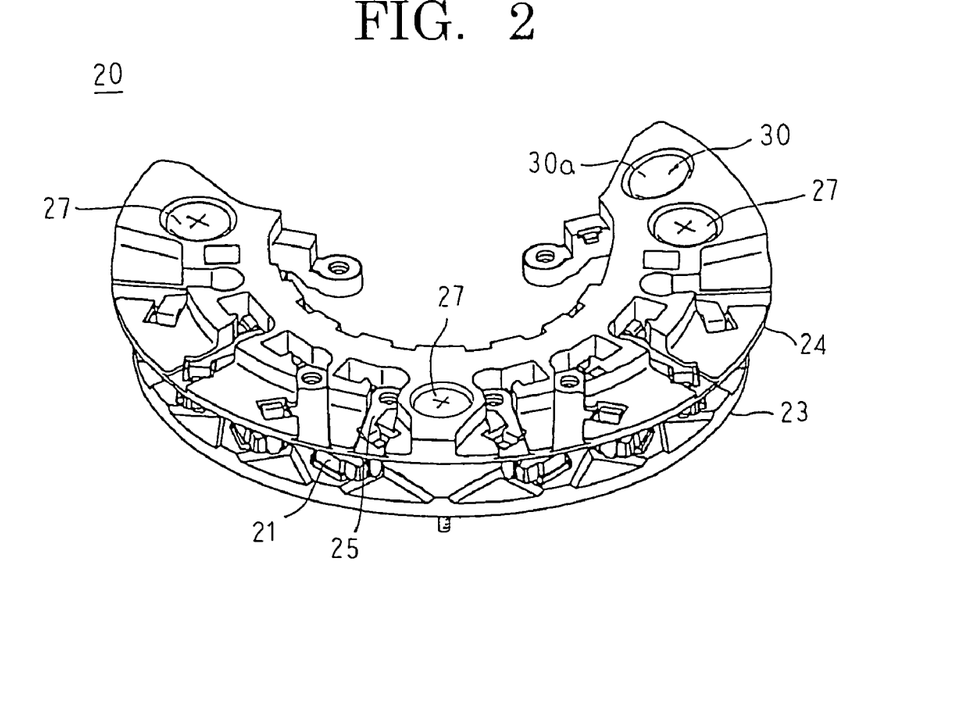
FIG. 2 is a perspective showing a rectifier apparatus used in the automotive alternator according to Embodiment 1 of the present invention.
Figure 3:
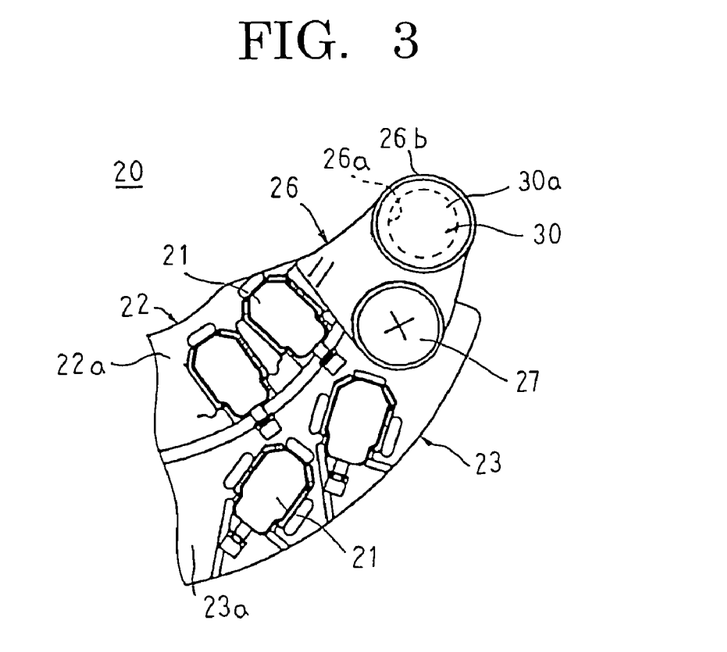
FIG. 3 is a partial top plan showing part of the rectifier apparatus used in the automotive alternator according to Embodiment 1 of the present invention with a circuit board removed.
Figure 4:
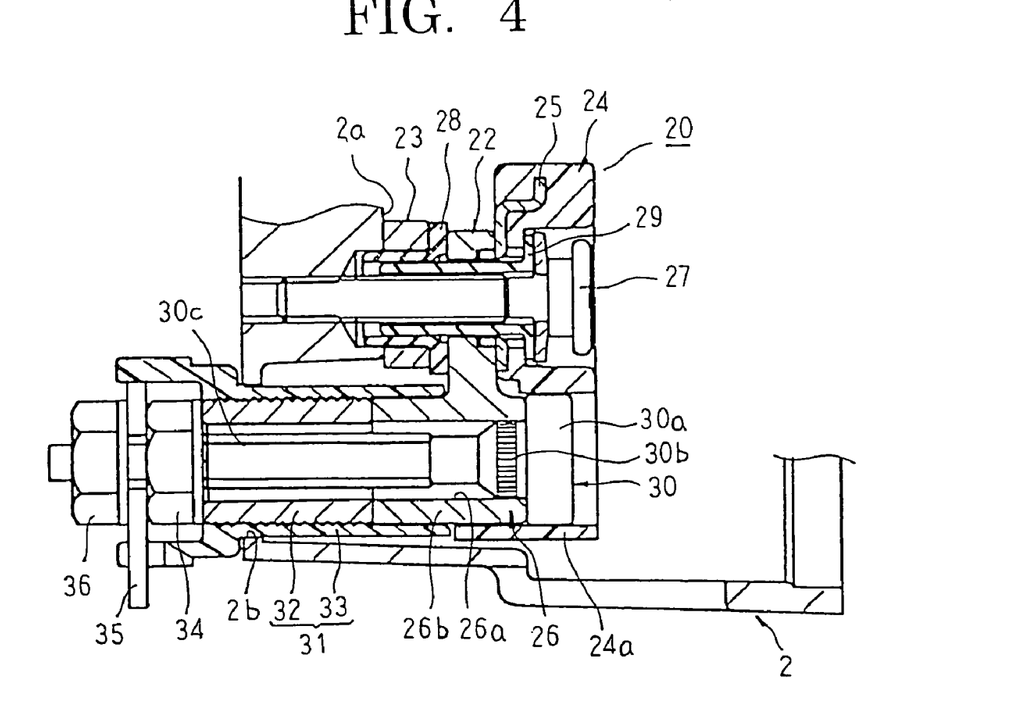
FIG. 4 is a partial cross section showing a wiring harness terminal mounted to an output terminal of the automotive alternator according to Embodiment 1 of the present invention.
Figure 5:
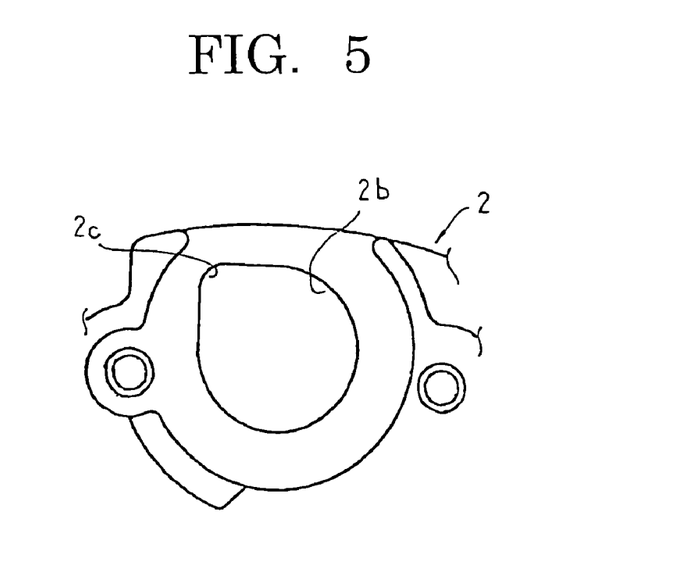
FIG. 5 is a partial front elevation showing a rear bracket in the automotive alternator according to Embodiment 1 of the present invention before the output terminal is mounted.
Figure 6:
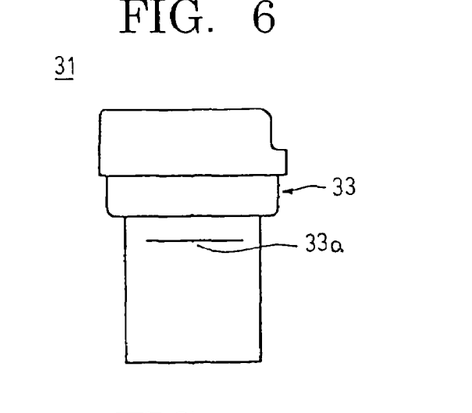
FIG. 6 is a side elevation showing a terminal molding in the automotive alternator according to Embodiment 1 of the present invention.
Figure 7:
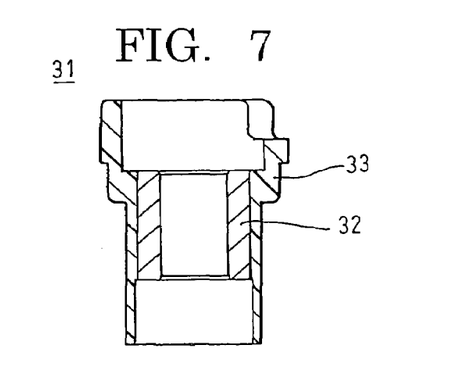
FIG. 7 is a cross section showing the terminal molding in the automotive alternator according to Embodiment 1 of the present invention.
Figure 8:
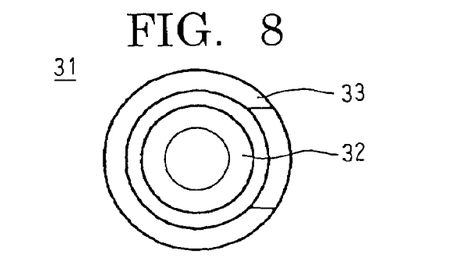
FIG. 8 is a top plan showing the terminal molding in the automotive alternator according to Embodiment 1 of the present invention.
Figure 9:
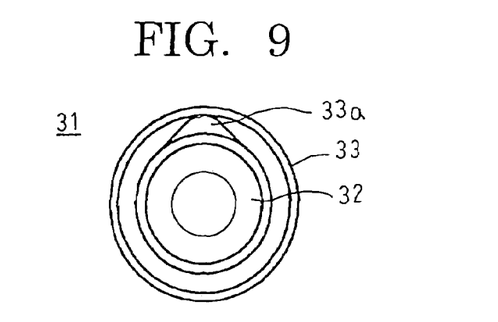
FIG. 9 is a bottom plan showing the terminal molding in the automotive alternator according to Embodiment 1 of the present invention.

FIG. 1 is a longitudinal section showing an automotive alternator according to Embodiment 1 of the present invention, FIG. 2 is a perspective showing a rectifier apparatus used in the automotive alternator according to Embodiment 1 of the present invention, FIG. 3 is a partial top plan showing part of the rectifier apparatus used in the automotive alternator according to Embodiment 1 of the present invention with a circuit board removed, FIG. 4 is a partial cross section showing a wiring harness terminal mounted to an output terminal of the automotive alternator according to Embodiment 1 of the present invention, FIG. 5 is a partial front elevation showing a rear bracket in the automotive alternator according to Embodiment 1 of the present invention before the output terminal is mounted, FIG. 6 is a side elevation showing a terminal molding in the automotive alternator according to Embodiment 1 of the present invention, FIG. 7 is a cross section showing the terminal molding in the automotive alternator according to Embodiment 1 of the present invention, FIG. 8 is a top plan showing the terminal molding in the automotive alternator according to Embodiment 1 of the present invention, and FIG. 9 is a bottom plan showing the terminal molding in the automotive alternator according to Embodiment 1 of the present invention.

In FIG. 1, an automotive alternator is provided with: a housing 3 constituted by a front bracket 1 and a rear bracket 2 made of aluminum; a shaft 6 disposed inside the housing 3, a pulley 4 fixed to a first end portion of the shaft 6; a Lundell-type rotor 7 fixed to the shaft 6; fans 5 fixed to first and second axial end portions of the rotor 7; a stator 8 fixed to the housing 3 so as to envelop the rotor 7; slip rings 9 fixed to a second end portion of the shaft 6 for supplying an electric current to the rotor 7; a pair of brushes 10 sliding on surfaces of the slip rings 9; a brush holder 11 for housing the brushes 10; a rectifier apparatus 20 electrically connected to the stator 8 for converting an alternating current generated in the stator 8 into a direct current; and a regulator 18 mounted to a heat sink 17 fitted onto the brush holder 11, the regulator 18 adjusting the magnitude of an alternating voltage generated in the stator 8.

The rotor 7 includes: a field winding 12 for generating a magnetic flux on passage of an electric current; and a pair of first and second pole cores 13 and 14 disposed so as to cover the field winding 12, magnetic poles being formed in the first and second pole cores 13 and 14 by the magnetic flux from the field winding 12. The stator 8 is constituted by: a cylindrical stator core 15; and a stator winding 16 installed in the stator core 15.

The rectifier apparatus 20, as shown in FIGS. 2 through 4, is constituted by: a plurality of diode elements 21 for full-wave rectification of a three-phase current; a positive-side heat sink 22 for supporting and cooling the diode elements 21; a negative-side heat sink 23 for supporting and cooling the diode elements 21; and a circuit board 24. Insert conductors 25 are insert-molded into the circuit board 24, the diode elements 21 being connected to the insert conductors 25 to constitute a three-phase full-wave rectifying circuit. Moreover, a good heat-conducting material such as aluminum is used in the positive-side and negative-side heat sinks 22 and 23, and a resin such as a polyphenylene sulfide (PPS), for example, is used in the circuit board 24.

The positive-side heat sink 22 is formed into a flat arc shape having flange portions 26 at first and second ends and a central portion in a circumferential direction, a plurality of the diode elements 21 being mounted to a major surface 22a so as to line up in a circumferential direction. Similarly, the negative-side heat sink 23 is formed into a flat arc shape having a larger diameter than that of the positive-side heat sink 22, a plurality of the diode elements 21 being mounted to a major surface 23a so as to line up in a circumferential direction. The positive-side and negative-side heat sinks 22 and 23 are disposed concentrically with the major surfaces 22a and 23a positioned in a common plane, the circuit board 24 being disposed on the major surfaces 22a and 23a of the positive-side and negative-side heat sinks 22 and 23. Here, the flange portions 26 at the first and second ends are positioned above first and second circumferential end portions of the major surface 23a of the negative-side heat sink 23. Although not shown, a central flange portion is positioned at a circumferentially-central portion of the major surface 23a of the negative-side heat sink 23. The flange portion 26 at the first end is formed so as to project circumferentially beyond an end portion of the negative-side heat sink 23. A leading end of a projecting portion of the flange portion 26 is formed so as to have a cylindrical portion 26b through which is disposed a penetrating aperture 26a having an aperture direction perpendicular to the major surface 22a of the positive-side heat sink 22. This cylindrical portion 26b functions as an output terminal mount portion, and is formed so as to project outward from the leading end of the projecting portion of the flange portion 26 on two sides in a direction perpendicular to the major surface 22a of the positive-side heat sink 22. In addition, a cover portion 24a for covering an outer periphery at an opposite end of the cylindrical portion 26b from an output extraction end is formed integrally on a first end of the circuit board 24.

Mounting screws 27 pass from inside the rear bracket 2 through the circuit board 24, the flange portions 26, and the negative-side heat sink 23 and are fastened to mounting surfaces 2a formed on an inner wall surface of the rear bracket 2. Thus, the rectifier apparatus 20 is fastened to the mounting surfaces 2a of the rear bracket 2 with the mounting screws 27 at three positions including first and second ends and a central portion in a circumferential direction. The positive-side heat sink 22 and the negative-side heat sink 23 are thereby disposed around the shaft 6 concentrically with the major surfaces 22a and 23a positioned on a plane perpendicular to a central axis of the shaft 6. The positive-side heat sink 22 is electrically insulated from the negative-side heat sink 23 and the mounting screws 27 by electrically-insulating bushes 28 and 29. The negative-side heat sink 23 is electrically connected to the rear bracket 2 through the mounting surfaces 2a.

Next, an automotive alternator output terminal construction will be explained with reference to FIGS. 4 through 9.

An output terminal 30 is made of an electrically-conductive material such as iron, etc., knurling being applied to a root portion of a head portion 30a to form a knurled portion 30b. A terminal molding 31 includes: a sleeve 32 functioning as a tubular relay member made into a cylindrical shape using an electrically-conductive material such as iron, etc.; and a tubular molded portion 33 functioning as an electrically-insulating member made into a cylindrical shape using a PPS resin, for example. This molded portion 33 is molded integrally with the sleeve 32 so as to envelop the sleeve 32 and project outward at first and second axial ends of the sleeve 32. A positioning lug 33a functioning as an engaging portion is formed on an outer peripheral surface of the molded portion 33. Knurling is also applied to an outer peripheral surface of the sleeve 32 such that the PPS resin interlocks to firmly integrate the sleeve 32 and the molded portion 33.

The output terminal 30 is mounted to the cylindrical portion 26b of the flange portion 26 at the first end of the positive-side heat sink 22 by press-fitting the knurled portion 30b into the penetrating aperture 26a disposed through the flange portion 26. The output extraction end of this output terminal 30 projects axially outward through an extraction aperture 2b disposed through the rear bracket 2. The terminal molding 31 is mounted onto the output terminal 30 through the extraction aperture 2b. Here, the extraction aperture 2b is formed so as to have an internal shape that is slightly larger than an external shape of the molded portion 33. The lug 33a of the molded portion 33 engages with a recess portion 2c of the extraction aperture 2b functioning as a receiving portion matching with the lug 33a to position the molded portion 33 around the central axis, in other words, to set an installation angle.

In addition, a relay member mounting nut 34 is fastened onto the external screw thread portion 30c at the output extraction end of the output terminal 30. The fastening force of this relay member mounting nut 34 is received by the head portion 30a of the output terminal 30 and an end surface of the cylindrical portion 26b of the flange portion 26 at an opposite end from the output extraction end coming into contact with each other to press and hold the sleeve 32 between the relay member mounting nut 34 and the cylindrical portion 26b of the flange portion 26. Thus, a state of surface contact is ensured between the sleeve 32 and the relay member mounting nut 34, and a state of surface contact is also ensured between the sleeve 32 and the cylindrical portion 26b of the flange portion 26.

The output extraction end of the cylindrical portion 26b of the flange portion 26 is surrounded by a portion at a first end of the molded portion 33 projecting outward from the sleeve 32. In addition, the opposite end of the cylindrical portion 26b (output terminal mount portion) of the flange portion 26 from the extraction end is surrounded by the cover portion 24a of the circuit board 24. The molded portion 33 and the cover portion 24a cover an outer peripheral surface of the cylindrical portion 26b of the flange portion 26 in close contact with each other so as not to expose the outer peripheral surface of the cylindrical portion 26b.

A wiring harness terminal 35 is fastened to the relay member mounting nut 34 by means of a wiring harness terminal mounting nut 36 screwed onto the output terminal 30.

In an automotive alternator constructed in this manner, an electric current is supplied to the field winding 12 from a battery (not shown) by means of the brushes 10 and the slip rings 9, generating a magnetic flux. Claw-shaped magnetic poles in the first pole core 13 are magnetized into North-seeking (N) poles by this magnetic flux, and claw-shaped magnetic poles in the second pole core 14 are magnetized into South-seeking (S) poles. At the same time, rotational torque from an engine is transmitted to the shaft 6 by means of a belt (not shown) and the pulley 4, rotating the rotor 7. Thus, a rotating magnetic field is imparted to the stator winding 16, generating an electromotive force in the stator winding 16. This alternating-current electromotive force passes through the rectifier apparatus 20 and is converted into a direct current and the magnitude thereof is adjusted by the regulator 18. Output from the rectifier apparatus 20 passes through the output terminal 30, the sleeve 32, and the wiring harness terminal 35 to charge the battery.

In Embodiment 1, because the sleeve 32 and the output extraction end of the cylindrical portion 26b of the flange portion 26, which are in close proximity to the rear bracket 2, are covered by the molded portion 33, electrical insulation is ensured between the sleeve 32 and the rear bracket 2 and between the flange portion 26 and the rear bracket 2. Because the sleeve 32 and the output extraction end of the cylindrical portion 26b of the flange portion 26, which have a higher electric potential than the rear bracket 2, are not exposed, corrosion of the sleeve 32 and the output extraction end of the cylindrical portion 26b of the flange portion 26 is suppressed even if the automotive alternator is used in an environment that is subjected to salt water, etc., improving electrical insulation. Because the opposite end of the cylindrical portion 26b of the flange portion 26 from the extraction end is covered by the cover portion 24a of the circuit board 24, electrical insulation is further improved.

The wiring harness terminal 35 is electrically connected in a state of surface contact with the relay member mounting nut 34, the relay member mounting nut 34 is electrically connected in a state of surface contact with the sleeve 32, and the sleeve 32 is electrically connected in a state of surface contact with the flange portion 26 (the positive-side heat sink 22). Thus, because fastening portions involving screw threads and coupling portions involving knurled portions are removed from a main electrical conduction pathway leading from the wiring harness terminal 35 to the positive-side heat sink 22, increases in electrical resistance are suppressed, enabling loss of output power to be reduced. In addition, heat generation in the electrical conduction pathway leading from the wiring harness terminal 35 to the positive-side heat sink 22 is suppressed, suppressing temperature increases in the diode elements 21 resulting from heat generated in that electrical conduction pathway.

Resin members such as the molded portion 33, etc., are not interposed in a fixing portion between the wiring harness terminal 35 and the relay member mounting nut 34, in a fixing portion between the relay member mounting nut 34 and the sleeve 32, or in a contacting portion between the sleeve 32 and the flange portion 26. Thus, the fastening forces of the relay member mounting nut 34 and the wiring harness terminal mounting nut 36 are ensured even if heat generation were hypothetically to arise in the coupling portions between the relay member mounting nut 34 and the output terminal 30 and between the wiring harness terminal mounting nut 36 and the output terminal 30, and heat degradation and thermal contraction of the molded portion 33 were to occur. Thus, the occurrence of insufficient force for fastening the wiring harness terminal 35 to the output terminal 30 is prevented.

Because the fastening force of the relay member mounting nut 34 for fixing the output terminal 30 to the positive-side heat sink 22 is received by a contact surface between the head portion 30*a* of the output terminal 30 and the flange portion 26 of the positive-side heat sink 22, the fastening force of the relay member mounting nut 34 is ensured even if heat generation were hypothetically to arise in the coupling portion between the knurled portion 30*b* and the penetrating aperture 26*a*. Thus, the occurrence of reductions in the force fastening the output terminal 30 to the positive-side heat sink 22 is prevented.

Because the sleeve 32 and the molded portion 33 are molded integrally, parts are reduced in number, improving assembly. Because knurling is applied to the outer peripheral surface of the sleeve 32, the bonding strength of the molded portion 33 onto the sleeve 32 is increased. Thus, even if the fastening force of the relay member mounting nut 34 acts on the molded portion 33, situations such as the molded portion 33 dislodging from the sleeve 32 are prevented.

Because the lug 33*a* disposed on the molded portion 33 is configured so as to engage with the recess portion 2*c* of the extraction aperture 2*b* of the rear bracket 2, rotation of the terminal molding 31 is prevented during fastening of the relay member mounting nut 34, facilitating mounting. In addition, a mounted position of the terminal molding 31 on the rear bracket 2 is constant, enabling a direction of mounting of the wiring harness terminal 35 onto the output terminal 30 to be fixed.

The flange portion 26 of the positive-side heat sink 22 is secured to the rear bracket 2 by fastening with a mounting screw 27 in the vicinity of the mounting position of the output terminal 30. Thus, because the output terminal 30 and the mounting screw 27 are in close proximity, resistance of the flange portion 26 to vibration is increased, suppressing the occurrence of damage to the flange portion 26 resulting from vibration being transmitted through the wiring harness terminal 35 to the output terminal 30.

Because the output terminal 30 is mounted to the cylindrical portion 26*b* of the flange portion 26, the output terminal 30 is positioned circumferentially outside the mounting screw 27 of the positive-side heat sink 22. Thus, the output terminal 30 is disposed on an opposite side of the mounting screw 27 from the diode elements 21 and the distance between the output terminal 30 and the diode elements 21 is increased, suppressing temperature increases in the diode elements 21 resulting from heat generation in the output terminal 30.

Moreover, in Embodiment 1 above, the engaging portion (the lug 33*a*) is explained as being formed on the molded portion 33 and the receiving portion (the recess portion 2*c*) as being formed in the extraction aperture 2*b*, but an engaging portion (a lug) may also be formed in an extraction aperture and a receiving portion (a recess portion) formed on a molded portion.

In Embodiment 1 above, the knurled portion 30*b* of the output terminal 30 is explained as being pressed into the penetrating aperture 26*a*, but an output terminal having an external screw thread portion formed on an opposite end from an extraction end may also be used, a one-sided tightening nut being inserted and fixed to the penetrating aperture 26*a*, and the external screw thread portion at the opposite end of the output terminal from the output extraction end being fastened to the one-sided tightening nut.

Embodiment 2

Figure 10:
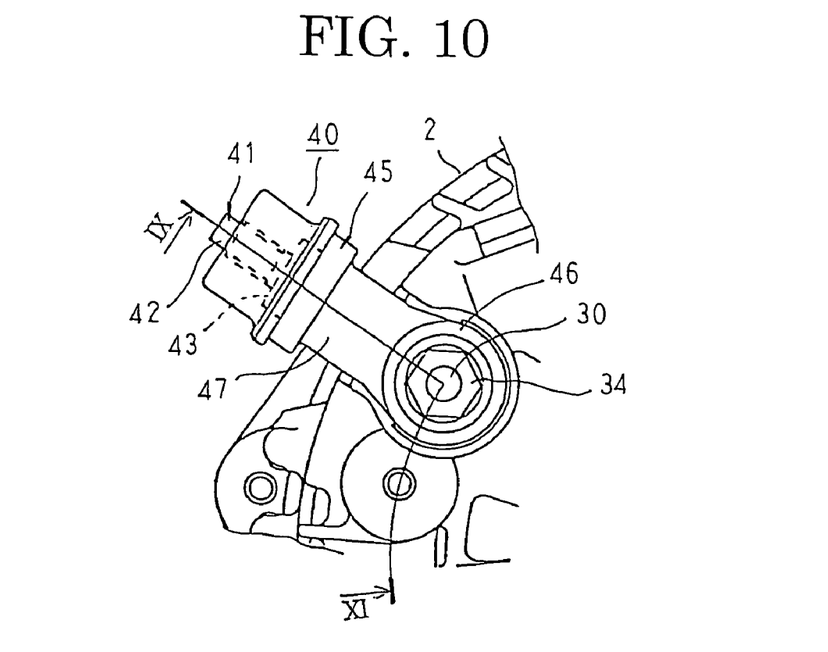
FIG. 10 is a partial front elevation showing a mounted state of an output terminal according to an automotive alternator according to Embodiment 2 of the present invention viewed from a rear end.
Figure 11:
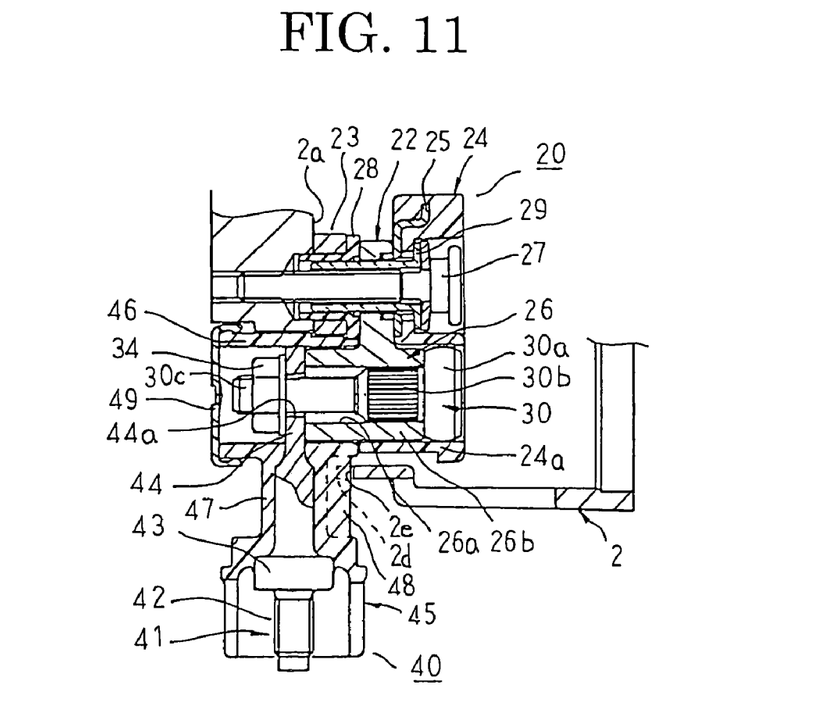
FIG. 11 is a cross section taken along line XI-XI in FIG. 10 viewed from the direction of the arrows.
Figure 12:
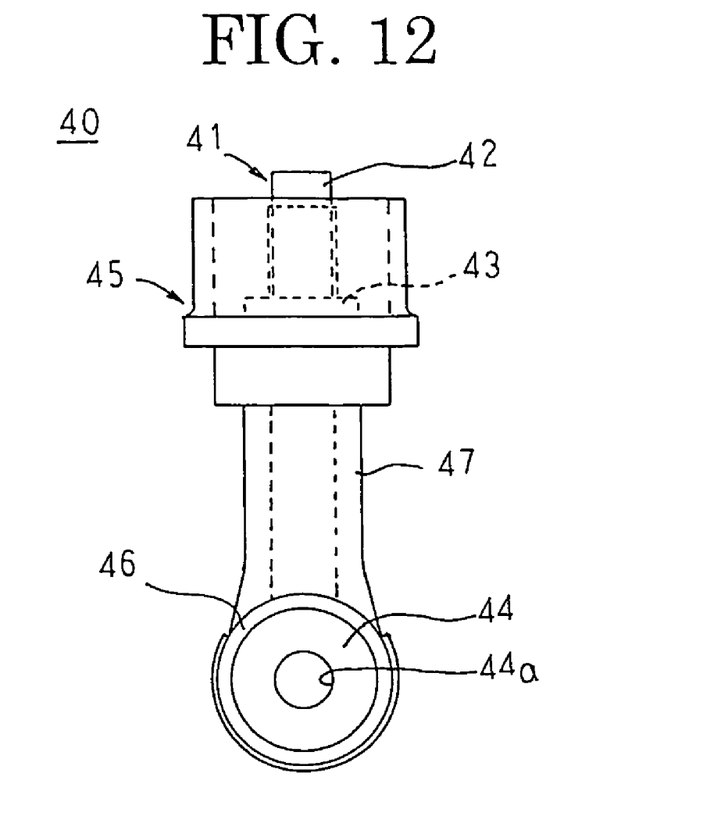
FIG. 12 is a front elevation showing a terminal molding in the automotive alternator according to Embodiment 2 of the present invention.
Figure 13:
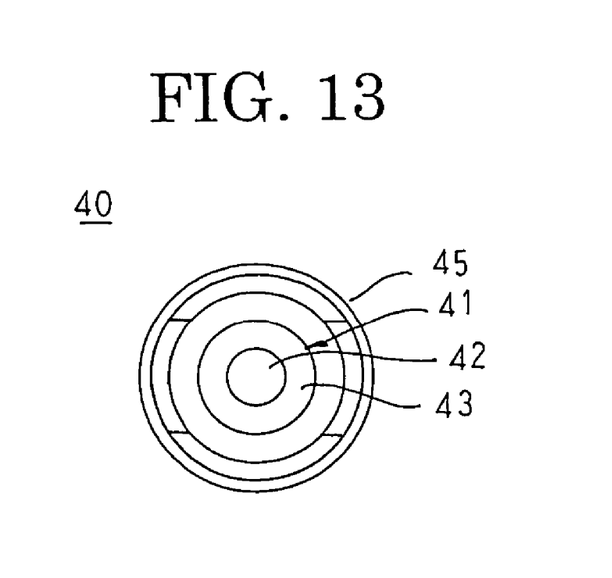
FIG. 13 is a top plan showing the terminal molding in the automotive alternator according to Embodiment 2 of the present invention.

FIG. 10 is a partial front elevation showing a mounted state of an output terminal according to an automotive alternator according to Embodiment 2 of the present invention viewed from a rear end, FIG. 11 is a cross section taken along line XI-XI in FIG. 10 viewed from the direction of the arrows, FIG. 12 is a front elevation showing a terminal molding in the automotive alternator according to Embodiment 2 of the present invention, and FIG. 13 is a top plan showing the terminal molding in the automotive alternator according to Embodiment 2 of the present invention. Moreover, FIG. 10 shows a state before mounting a cover.

In FIGS. 10 through 13, a terminal molding 40 includes: a relay bolt 41 functioning as a relay member made of an electrically-conductive material such as iron, etc.; and a molded portion 45 functioning as an electrically-insulating member integrally molded around the relay bolt 41 using a PPS resin, for example.

An external screw thread portion 42 is formed on a first end of the relay bolt 41, and a flat mount portion 44 is formed on a second end. A coupling seat 43 is formed on a root portion of the external screw thread portion 42, and a penetrating aperture 44*a* is formed on the flat mount portion 44.

The molded portion 45 is molded such that the external screw thread portion 42, the coupling seat 43, and the flat mount portion 44 of the relay bolt 41 are exposed. The molded portion 45 has an electrically-insulating tube (tubular) portion 46 and a resin portion 47. The flat mount portion 44 is molded so as to divide the electrically-insulating tube portion 46 into two sections. The resin portion 47 is formed integrally with the electrically-insulating tube portion 46 so as to embed a portion of the relay bolt 41 extending from the flat mount portion 44 to the coupling seat 43. In addition, a hook portion 48 functioning as an engaging portion is disposed so as to protrude from the resin portion 47.

Here, an output terminal 30 is mounted to a cylindrical portion 26*b* of a flange portion 26 at a first end of a positive-side heat sink 22 by press-fitting a knurled portion 30*b* into a penetrating aperture 26*a* disposed through the flange portion 26. An external screw thread portion 30*c* at an output extraction end of the output terminal 30 is disposed so as to extend in an axial direction of a shaft 6. The flat mount portion 44 is mounted to the penetrating aperture 44*a* so as to pass through the output extraction end of the output terminal 30, and a relay member mounting nut 34 is fastened onto the external screw thread portion 30*c* of the output terminal 30. The fastening force of this relay member mounting nut 34 is received by a head portion 30a of the output terminal 30 and an end surface of the cylindrical portion 26b of the flange portion 26 at an opposite end from the output extraction end coming into contact with each other to press and hold the flat mount portion 44 between the relay member mounting nut 34 and the cylindrical portion 26b of the flange portion 26. Thus, a state of surface contact is ensured between the flat mount portion 44 and the cylindrical portion 26b of the flange portion 26. Moreover, the external screw thread portion 30c of the output terminal 30 corresponds to a first external screw thread portion, and the external screw thread portion 42 of the relay bolt 41 corresponds to a second external screw thread portion.

The terminal molding 40 is led radially outward perpendicular to the axial direction of the shaft 6 through an extraction aperture 2d formed in the rear bracket 2. The hook portion 48 engages with a recess portion 2e of the extraction aperture 2d functioning as a receiving portion to position the terminal molding 40 around the central axis.

Here, the electrically-insulating tube portion 46 surrounds the output extraction end of the cylindrical portion 26b on a first side of the flat mount portion 44, and surrounds the relay member mounting nut 34 screwed onto the external screw thread portion 42 on a second side of the flat mount portion 44. A cover 49 is fitted onto an opening portion of the electrically-insulating tube portion 46 on the second side of the flat mount portion 44 to seal off a fastening portion of the relay member mounting nut 34 from exterior portions. In addition, the opposite end of the cylindrical portion 26b of the flange portion 26 from the extraction end is surrounded by a cover portion 24a of a circuit board 24.

A wiring harness terminal 35 (as shown in FIG. 4) is fastened to the coupling seat 43 (FIGS. 10-13) by means of a wiring harness terminal mounting nut 36 (FIG. 4) screwed onto the external screw thread portion 42. Here, the wiring harness terminal 35 is pressed and held between the wiring harness terminal mounting nut 36 and the coupling seat 43. Thus, a state of surface contact is ensured between the wiring harness terminal 35 and the coupling seat 43.

Moreover, the rest of this embodiment is configured in a similar manner to Embodiment 1 above.

In Embodiment 2, because the flat mount portion 44 and the output extraction end of the cylindrical portion 26b of the flange portion 26, which are in close proximity in the rear bracket 2, are covered by the electrically-insulating tube portion 46, electrical insulation is ensured between the flat mount portion 44 and the rear bracket 2 and between the flange portion 26 and the rear bracket 2. Furthermore, because the cover 49 is fitted onto the electrically-insulating tube portion 46 so as to cover the opening, the fastening portion of the relay member mounting nut 34 is not exposed, and electrical insulation is reliably ensured between the flat mount portion 44 and the rear bracket 2.

Because the flat mount portion 44 and the output extraction end of the cylindrical portion 26b of the flange portion 26, which have a higher electric potential than the rear bracket 2, are not exposed, corrosion of the flat mount portion 44 and the output extraction end of the cylindrical portion 26b of the flange portion 26 is suppressed even if the automotive alternator is used in an environment that is subjected to salt water, etc., improving electrical insulation. Because the opposite end of the cylindrical portion 26b of the flange portion 26 from the extraction end is covered by the cover portion 24a of the circuit board 24, electrical insulation is further improved.

The wiring harness terminal 35 is electrically connected in a state of surface contact with the coupling seat 43, and the flat mount portion 44 is electrically connected in a state of surface contact with the flange portion 26 (the positive-side heat sink 22). Thus, because fastening portions involving screw threads and coupling portions involving knurled portions are removed from a main electrical conduction pathway leading from the wiring harness terminal 35 to the positive-side heat sink 22, increases in electrical resistance are suppressed, enabling loss of output power to be reduced. In addition, heat generation in the electrical conduction pathway leading from the wiring harness terminal 35 to the positive-side heat sink 22 is suppressed, suppressing temperature increases in the diode elements 21 resulting from heat generated in that electrical conduction pathway.

Resin members such as the molded portion 45, etc., are not interposed in a fixing portion between the wiring harness terminal 35 and the relay bolt 41 or in a contacting portion between the flat mount portion 44 and the flange portion 26. Thus, the fastening forces of the relay member mounting nut 34 and the wiring harness terminal mounting nut 36 are ensured even if heat generation were hypothetically to arise in the coupling portion between the relay member mounting nut 34 and the output terminal 30 or in a coupling portion between the wiring harness terminal mounting nut 36 and the relay bolt 41, and heat degradation and thermal contraction of the molded portion 45 were to occur. Thus, insufficient force for fastening the wiring harness terminal 35 to the relay bolt 41 and insufficient force for fastening the flat mount portion 44 to the output terminal 30 are prevented.

Because the fastening force of the relay member mounting nut 34 for fixing the flat mount portion 44 of the relay bolt 41 to the positive-side heat sink 22 is received by a contact surface between the head portion 30a of the output terminal 30 and the flange portion 26 of the positive-side heat sink 22, the fastening force of the relay member mounting nut 34 is ensured even if heat generation were hypothetically to arise in the coupling portion between the knurled portion 30b and the penetrating aperture 26a. Thus, the occurrence of reductions in the force fastening the output terminal 30 to the positive-side heat sink 22 is prevented.

Because the relay bolt 41 and the molded portion 45 are molded integrally, parts are reduced in number, improving assembly.

Because the hook portion 48 disposed on the molded portion 45 is configured so as to engage with the recess portion 2e of the extraction aperture 2d of the rear bracket 2, rotation of the terminal molding 40 is prevented during fastening of the relay member mounting nut 34, facilitating mounting. In addition, a mounted position of the terminal molding 40 on the rear bracket 2 is constant, enabling a direction of mounting of the wiring harness terminal 35 onto the relay bolt 41 to be fixed.

Because the terminal molding 40 is configured so as to project outward radially, a length of the output terminal 30 can be shortened so as not project outward axially through the rear bracket 2, enabling axial dimensions of the alternator to be shortened.

The flange portion 26 of the positive-side heat sink 22 is secured to the rear bracket 2 by fastening with a mounting screw 27 in the vicinity of the mounting position of the output terminal 30. Thus, because the output terminal 30 and the mounting screw 27 are in close proximity, resistance of the flange portion 26 to vibration is increased, suppressing the occurrence of damage to the flange portion 26 resulting from vibration being transmitted through the wiring harness terminal 35 and the terminal molding 40 to the output terminal 30.

Because the output terminal 30 is mounted to the cylindrical portion 26b of the flange portion 26, the output terminal 30 is positioned circumferentially outside the mounting screw 27 of the positive-side heat sink 22. Thus, the output terminal 30 is disposed on an opposite side of the mounting screw 27 from the diode elements 21 and the distance between the output terminal 30 and the diode elements 21 is increased, suppressing temperature increases in the diode elements 21 resulting from heat generation in the output terminal 30.

Moreover, in Embodiment 2 above, the engaging portion (the hook portion 48) is explained as being formed on the resin portion 47 of the molded portion 45 and the receiving portion (the recess portion 2e) as being formed in the extraction aperture 2d, but an engaging portion (a hook portion) may also be formed in an extraction aperture and a receiving portion (a recess portion) formed on a resin portion of a molded portion.

In Embodiment 2 above, an output terminal 30 is explained as being used, but an output terminal having an external screw thread portion formed on an opposite end from an extraction end may also be used, a one-sided tightening nut being inserted and fixed to the penetrating aperture 26a, and the external screw thread portion at the opposite end of the output terminal from the output extraction end being fastened to the one-sided tightening nut.

In each of the above embodiments, an automotive alternator has been explained, but the present invention is not limited to automotive alternators and may also be applied to dynamoelectric machines such as alternating-current motors, alternating-current electric motor-generators, etc. In addition, the present invention is not limited to dynamoelectric machines for automotive use and can also be applied to dynamoelectric machines for marine vessels, for example.

What is claimed is:

1. A dynamoelectric machine comprising:
a rectifier apparatus having positive-side and negative-side heat sinks each mounted with a plurality of diode elements; and a circuit board made of a resin in which insert conductors for connecting said diode elements are insert molded, said rectifier apparatus being mounted to a housing by electrically-connecting said negative-side heat sink to said housing and fastening said positive-side and negative-side heat sinks and said circuit board to a mounting surface of said housing;
an output terminal for externally extracting output from said rectifier apparatus; and
a wiring harness terminal mounted to said output terminal, wherein:
an output terminal mount portion is formed so as to project in an axial direction of said dynamoelectric machine from a first end of said positive-side heat sink;
said output terminal has an external screw thread portion disposed on an output extraction end thereof, said output terminal being disposed by mounting an opposite end from said extraction end to said output terminal mount portion such that said external screw thread portion projects outward in said axial direction through an extraction aperture formed in said housing;
a tubular relay member is mounted to said output terminal so as to be fitted over said output extraction end of said output terminal and is fastened between said output terminal mount portion and a relay member mounting nut screwed onto said external thread portion of said output terminal such that said relay member is in a state of surface contact with said output terminal mount portion and said relay member mounting nut;
said wiring harness terminal is fastened between said relay member mounting nut and a wiring harness terminal mounting nut screwed onto said external thread portion of said output terminal such that said wiring harness terminal is in a state of surface contact with said relay member mounting nut and said wiring harness terminal mounting nut; and
a tubular electrically-insulating member is disposed so as to cover an output extraction end of said output terminal mount portion and said relay member,
wherein said electrically-insulating member is molded integrally with said relay member, and knurling is applied to an outer peripheral surface of said relay member.

2. The dynamoelectric machine according to claim 1, wherein:
a first portion selected from an engaging portion and a receiving portion is formed on an outer peripheral portion of said electrically-insulating member, a remaining portion selected from said engaging portion and said receiving portion is formed in said extraction aperture, and said electrically-insulating member is positioned relative to said housing by engagement between said engaging portion and said receiving portion.

3. The dynamoelectric machine according to claim 1, wherein:
a cover portion is formed integrally on a first end of said circuit board so as to fit over an opposite end of said output terminal mount portion from an extraction end when mounted.

4. The dynamoelectric machine according to claim 1, wherein:
said output terminal mount portion is in close proximity to a position where said rectifier apparatus is fastened to said housing.

5. A dynamoelectric machine comprising:
a rectifier apparatus having positive-side and negative-side heat sinks each mounted with a plurality of diode elements; and a circuit board made of a resin in which insert conductors for connecting said diode elements are insert molded, said rectifier apparatus being mounted to a housing by electrically-connecting said negative-side heat sink to said housing and fastening said positive-side and negative-side heat sinks and said circuit board to a mounting surface of said housing;
an output terminal for externally extracting output from said rectifier apparatus;
a relay member mounted to said output terminal; and
a wiring harness terminal mounted to said relay member, wherein:
an output terminal mount portion is formed so as to project in an axial direction of said dynamoelectric machine from a first end of said positive-side heat sink;
said output terminal has a first external screw thread portion disposed on an output extraction end thereof said output terminal being, disposed so as to extend in said axial direction by mounting an opposite end from said extraction end to said output terminal mount portion;
said relay member as a coupling seat, a second external screw thread portion formed on a first side of said coupling seat, and a flat mount portion formed on a second side of said coupling seat, said flat mount portion being fastened between said output terminal mount portion and a relay member mounting nut screwed onto said first external thread portion such that said flat mount portion is in a state of surface contact with said output terminal mount portion and said relay member mounting nut, and said relay member being disposed such that said second external screw thread portion is made to project outward in a radial direction of said dynamoelectric machine through an extraction aperture formed in said housing;

said wiring harness terminal is fastened between said coupling seat and a wiring harness terminal mounting nut screwed onto said second external thread portion of said output terminal such that said wiring harness terminal is in a state of surface contact with said coupling seat and said wiring harness terminal mounting nut;

an electrically-insulating member is disposed so as to cover an output extraction end of said output terminal mount portion, said first external screw thread portion, said relay member mounting nut, and said relay member;

said electrically-insulating member is molded integrally with said relay member; and said electrically-insulating member comprises:

a resin portion formed so as to embed a portion of said relay member extending from said coupling seat to said mount portion; and an electrically-insulating tube portion formed integrally with said resin portion such that regions of contact of said flat mount portion with said relay member mounting nut and said output terminal mount portion are exposed, said electrically-insulating tube portion being mounted so as to be fitted over said output extraction end of said output terminal mount portion on a first side of said flat mount portion, said electrically-insulating tube portion surrounding said relay member mounting nut screwed onto said first external screw thread portion on a second side of said flat mount portion, and a cover being removably mounted so as to cover an opening of said electrically-insulating tube portion on said second side of said flat mount portion.

6. The dynamoelectric machine according to claim 5, wherein:

knurling is applied to an outer peripheral surface of said relay member.

7. The dynamoelectric machine according to claim 5, wherein:

a first portion selected from an engaging portion and a receiving portion is formed on an outer peripheral portion of said electrically-insulating member, a remaining portion selected from said engaging portion and said receiving portion is formed in said extraction aperture, and said electrically-insulating member is positioned relative to said housing by engagement between said engaging portion and said receiving portion.

8. The dynamoelectric machine according to claim 5, wherein:

a cover portion is formed integrally on a first end of said circuit board so as to fit over an opposite end of said output terminal mount portion from an extraction end when mounted.

9. The dynamoelectric machine according to claim 5, wherein:

said output terminal mount portion is in close proximity to a position where said rectifier apparatus is fastened to said housing.

* * * * *